US008325755B2

(12) United States Patent
Lee et al.

(10) Patent No.: US 8,325,755 B2
(45) Date of Patent: Dec. 4, 2012

(54) METHOD FOR PERFORMING RANDOM ACCESS PROCESS IN WIRELESS COMMUNICATION SYSTEM

(75) Inventors: Eunjong Lee, Anyang-si (KR); Doo-Hyun Sung, Anyang-si (KR); Jaehoon Chung, Anyang-si (KR); Han Gyu Cho, Anyang-si (KR); Kyujin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 275 days.

(21) Appl. No.: 12/674,127

(22) PCT Filed: Sep. 8, 2008

(86) PCT No.: PCT/KR2008/005286
§ 371 (c)(1),
(2), (4) Date: Feb. 18, 2010

(87) PCT Pub. No.: WO2009/038300
PCT Pub. Date: Mar. 26, 2009

(65) Prior Publication Data
US 2011/0032889 A1   Feb. 10, 2011

Related U.S. Application Data

(60) Provisional application No. 60/973,177, filed on Sep. 18, 2007.

(30) Foreign Application Priority Data

Jan. 25, 2008  (KR) ................. 10-2008-0007768

(51) Int. Cl.
*H04J 3/00* (2006.01)
*H04J 3/02* (2006.01)

(52) U.S. Cl. ........................ 370/462; 370/337

(58) Field of Classification Search .............. 370/468, 370/329, 330, 321, 337, 344, 347, 252, 253, 370/254, 312, 328, 462, 338, 431, 343
See application file for complete search history.

(56) References Cited

U.S. PATENT DOCUMENTS 7,016,680 B2   3/2006   Yagi
(Continued)

FOREIGN PATENT DOCUMENTS

| CN | 1505416 A | 6/2004 |
|---|---|---|
| CN | 1835627 A | 9/2006 |
| KR | 10-2007-0023203 A | 2/2007 |
| WO | WO-2007/052888 A2 | 5/2007 |
| WO | WO-2007/052916 A1 | 5/2007 |

OTHER PUBLICATIONS

3GPP TS 36.300 V8.1.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Jul. 3, 2007.

(Continued)

*Primary Examiner* — Hanh Hguyen
(74) *Attorney, Agent, or Firm* — Birch, Stewart, Kolasch & Birch, LLP

(57) ABSTRACT

A method of performing a random access process in a wireless communication system includes transmitting a random access preamble, receiving a random access response including uplink radio resource allocation information for multiple transmission time intervals (TTIs) in response to the random access preamble, transmitting a radio resource control (RRC) connection request message according to the uplink radio resource allocation information, and transmitting a non-access stratum (NAS) service request message according to the uplink radio resource allocation information.

8 Claims, 9 Drawing Sheets

U.S. PATENT DOCUMENTS

| | | | |
|---|---|---|---|
| 7,904,055 B2* | 3/2011 | Lee et al. | 455/411 |
| 7,916,689 B2* | 3/2011 | Jeong et al. | 370/328 |
| 2003/0040311 A1 | 2/2003 | Choi | |
| 2003/0054820 A1 | 3/2003 | Kang et al. | |
| 2004/0162074 A1 | 8/2004 | Chen | |
| 2005/0037798 A1 | 2/2005 | Yamashita et al. | |
| 2005/0090278 A1 | 4/2005 | Jeong et al. | |
| 2005/0153700 A1 | 7/2005 | Farnsworth et al. | |
| 2007/0053383 A1 | 3/2007 | Choi et al. | |
| 2007/0098053 A1 | 5/2007 | Rinne et al. | |
| 2007/0116094 A1 | 5/2007 | Parts et al. | |
| 2007/0123265 A1 | 5/2007 | Moon | |
| 2008/0043771 A1* | 2/2008 | Cho et al. | 370/431 |
| 2008/0049708 A1* | 2/2008 | Khan et al. | 370/343 |
| 2008/0176565 A1 | 7/2008 | Eerolainen et al. | |
| 2008/0220784 A1 | 9/2008 | Somasundaram et al. | |
| 2008/0313300 A1 | 12/2008 | Alanara et al. | |
| 2009/0088160 A1 | 4/2009 | Pani et al. | |
| 2010/0195522 A1* | 8/2010 | Lee et al. | 370/252 |
| 2010/0195579 A1* | 8/2010 | Park et al. | 370/329 |

OTHER PUBLICATIONS

Ghosh et al., "Random Access Design for UMTS Air-Interface Evolution", In: Vehicular Technology Conference, Apr. 2007, VTC2007-Spring. IEEE 65th, 22-25, pp. 1041-1045.

Ericsson, "Summary of E-mail discussion on cell reselection parameters in LTE," 3GPP TSG-RAN WG2 #58, May 7-11, 2007, Kobe, Japan, Tdoc R2-071808, pp. 1-4.

Nokia Siemens Networks, Nokia, "E-UTRA Measurements and Cell Reselection Considerations", 3GPP TSG-RAN WG2 Meeting #58bis, R2-072386, R2-071727, Jun. 25-29, 2007, pp. 1-5.

Nokia, Nokia Siemens Networks, "E-UTRA Cell Selection and Cell Reselection Aspects", 3GPP TSG-RAN4 Metting #43bis, R4-071118, Jun. 25-29, 2007, pp. 1-5.

3GPP TS 25.304 V7.2.0, 3rd Generation Partnership Project; Technical Specification Group Radio Access Network; User Equipment (UE) Procedures in Idle Mode and Procedures for Cell Reselection in Connected Mode, (Release 7), Jun. 2007, pp. 1-19.

3GPP TR 25.813 V7.1.0 (Sep. 2006), "3rd General Partnership Project: Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)," 5 pages.

Motorola, "Random Access Procedure and Message Contents," 3GPP TSG-RAN WG2 AH, R2-061991, Jun. 27-30, 2006, Cannes, France, 4 pages.

Samsung, "Contention Resolution," 3GPP TSG RAN2#54, R2-062260, Agenda Item 11.3.4, Tallinn, Estonia, IMSI, Aug. 2-Sep. 2006, 2 pages.

* cited by examiner

METHOD FOR PERFORMING RANDOM ACCESS PROCESS IN WIRELESS COMMUNICATION SYSTEM

This application is the National Phase of PCT/KR2008/005286 filed on Sep. 8, 2008, which claims priority under 35 U.S.C. 119(e) to U.S. Provisional Application No. 60/973,177 filed on Sep. 18, 2007 and under 35 U.S.C. 119(a) to Patent Application No. 10-2008-0007768 filed in Republic of Korea on Jan. 25, 2008, all of which are hereby incorporated by reference into the present application.

TECHNICAL FIELD

The present invention relates to wireless communications, and more particularly, to a method for performing a random access process.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

In general, there are one or more cells within the coverage of a base station (BS). A plurality of user equipments (UEs) may be located in one cell. A UE accesses to a network by performing a random access process. The random access process may be used when the UE adjusts time synchronization with the network or when the UE obtains radio resources if there is no radio resource for uplink communication.

When the UE is powered on for initial access to a new cell, the UE is downlink synchronized and receives system information of the cell to be accessed. According to the received system information, the UE requests to the BS an uplink radio resource for transmitting a radio resource control (RRC) connection request message through a random access channel (RACH). The BS receives the request for the uplink radio resource and allocates a suitable radio resource to the UE so that the UE can transmit the RRC connection request message. Then, the UE transmits the RRC connection request message to the BS by using the radio resource. The BS transmits a message indicating that the random access of the UE is successful. Upon successfully performing the random access, the UE can transmit a control message to a network. However, in order for the UE to transmit and receive actual user data, an RRC connection has to be completely established between the UE and the network. The RRC connection between the UE and the network is completely established by configuring a non-access stratum (NAS) layer which is an upper layer of an RRC layer. For this, the UE transmits a NAS service request message to the BS, and the BS transmits it to the network. The NAS service request message is a message for requesting configuration of the NAS layer so that user data can be transmitted between the UE and the network.

In general, a delay time required to perform an RRC connection establishment process for switching from an idle state to an active state is 100 ms or less. In the RRC connection establishment process, the delay time between the network and the BS may significantly vary with the development of functions of the network. The delay time is expected to be not short. However, at present, there is no clearly proposed mechanism for satisfying the delay time required in the RRC connection establishment process.

A time for performing the RRC connection establishment process between the UE and the network is equal to a delay time directly experienced by a user. The delay time needs to be minimized to improve system quality. Accordingly, there is a need for a method for improving system quality with a minimum delay time.

DISCLOSURE

Technical Problem

The present invention provides a method for effectively performing a random access process.

Technical Solution

In an aspect, a method of performing a random access process in a wireless communication system includes transmitting a random access preamble, receiving a random access response including uplink radio resource allocation information for multiple transmission time intervals (TTIs) in response to the random access preamble, transmitting a radio resource control (RRC) connection request message according to the uplink radio resource allocation information, and transmitting a non-access stratum (NAS) service request message according to the uplink radio resource allocation information.

In another aspect, a method of performing a random access includes receiving an RRC connection request message, allocating an uplink radio resource upon receiving the RRC connection request message, transmitting a contention resolution message in response to the RRC connection request message, with instructing the uplink radio resource for a NAS service request message by an RRC layer to a MAC layer, and transmitting information regarding the uplink radio resource.

Advantageous Effects

According to the present invention, a non-access stratum (NAS) service request message and a radio resource control (RRC) connection request message can be transmitted together even in a case where a channel state is poor in an RRC connection establishment process. Further, a radio resource for transmitting the NAS service request message can be allocated without an additional request message. Therefore, a delay time of the RRC connection establishment process can be reduced.

MODE FOR INVENTION

Figure 1:
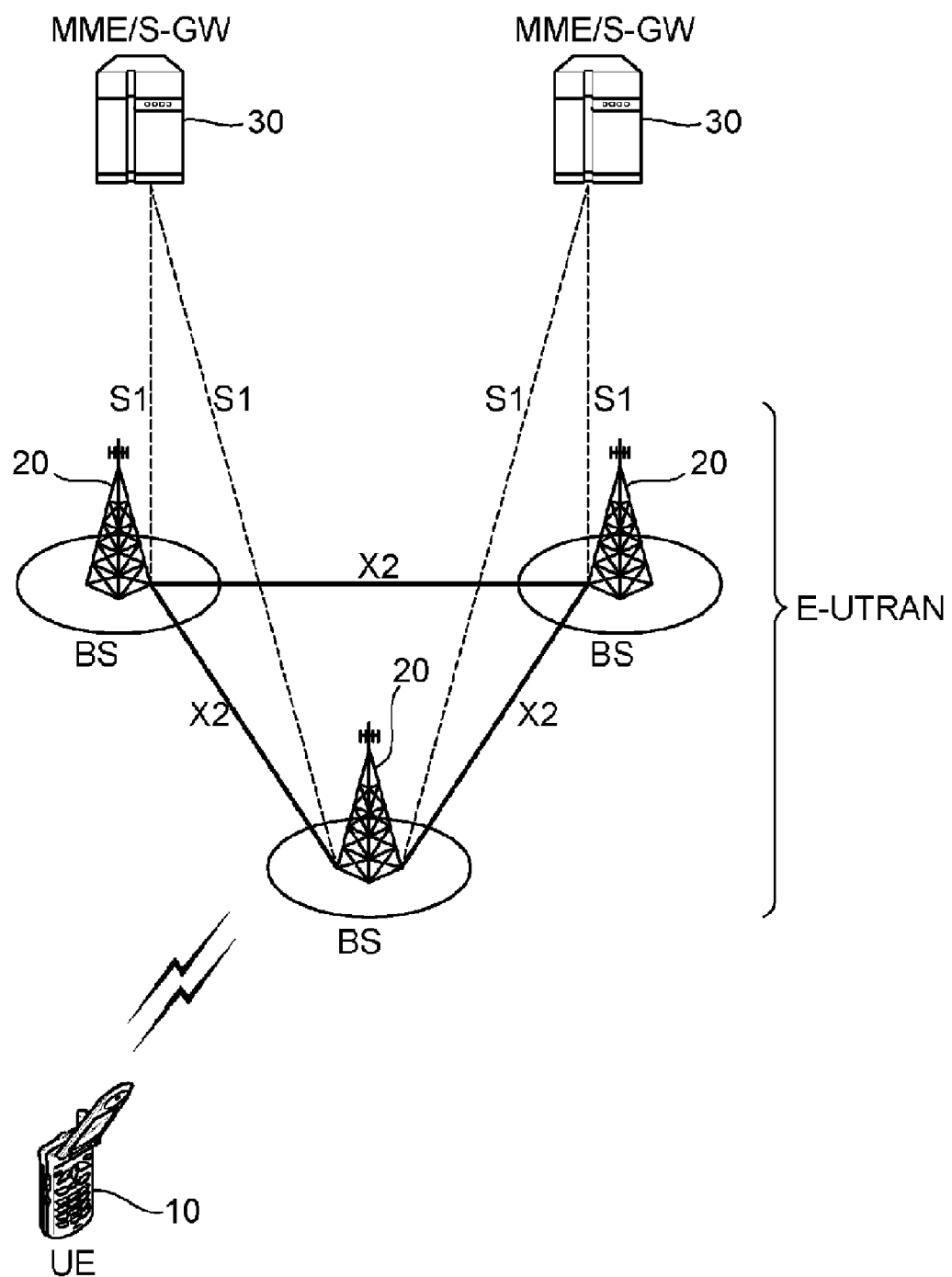
FIG. 1 shows a structure of a wireless communication system.

FIG. 1 shows a structure of a wireless communication system. The wireless communication system may have a network structure of an evolved-universal mobile telecommunications system (E-UMTS). The E-UMTS may be referred to as a long-term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink (DL) is defined as a communication link from the BS 20 to the UE 10, and an uplink (UL) is defined as a communication link from the UE 10 to the BS 20.

The BSs 20 are interconnected by means of an X2 interface. The BSs 20 are also connected by means of an Si interface to an evolved packet core (EPC), more specifically, to a mobility management entity (MME)/serving gateway (S-GW) 30. The Si interface supports a many-to-many relation between the BS 20 and the MME/S-GW 30.

Figure 2:
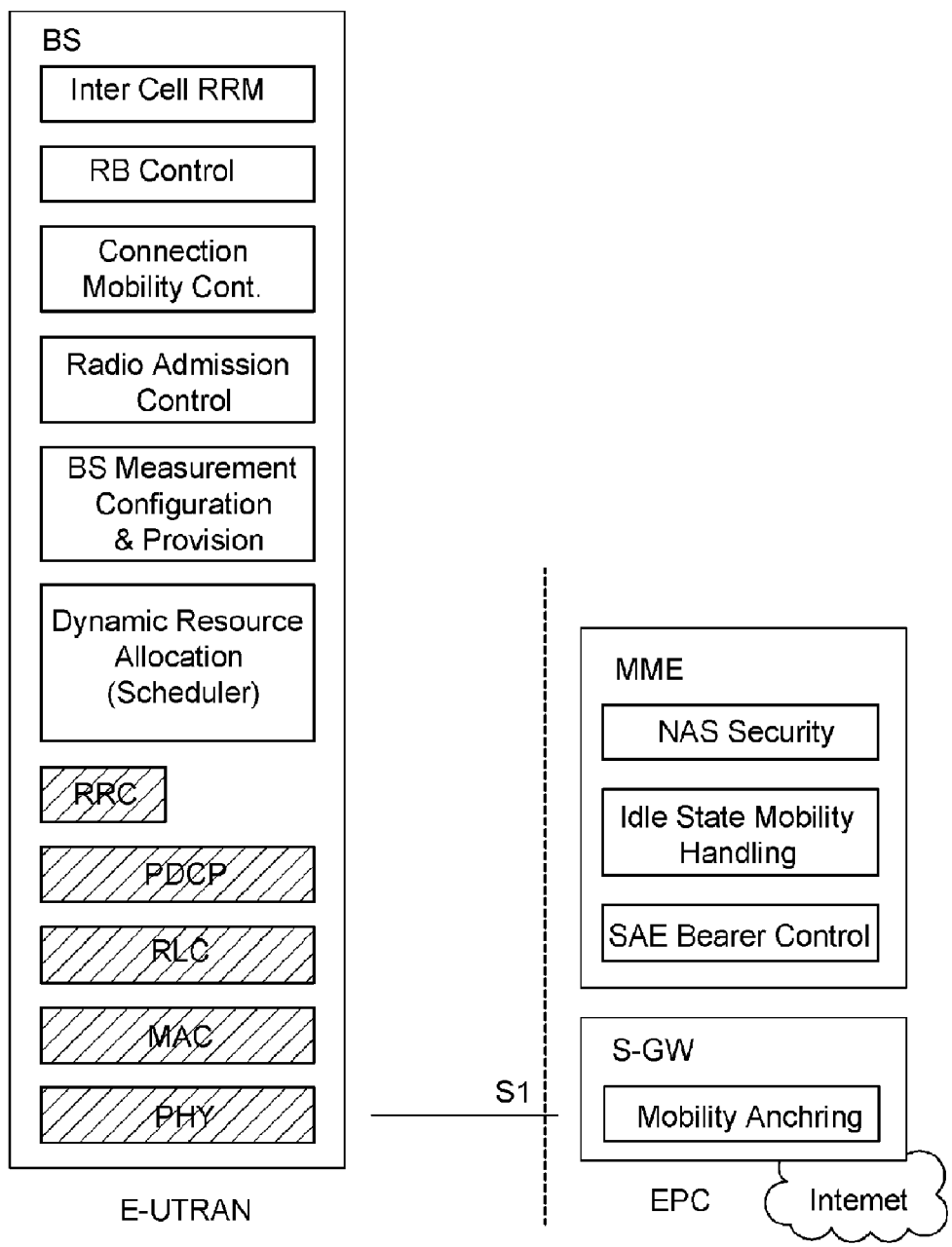
FIG. 2 is a diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes indicate radio protocol layers and white boxes indicate functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) distribution of paging messages to the BSs; (2) security control; (3) idle state mobility control; (4) S-GW bearer control; and (5) ciphering and integrity protection of non-access stratum (NAS) signaling.

The S-GW gateway performs the following functions: (1) termination of a user plane packet for paging; and (2) user plane switching for the support of UE mobility.

Figure 3:
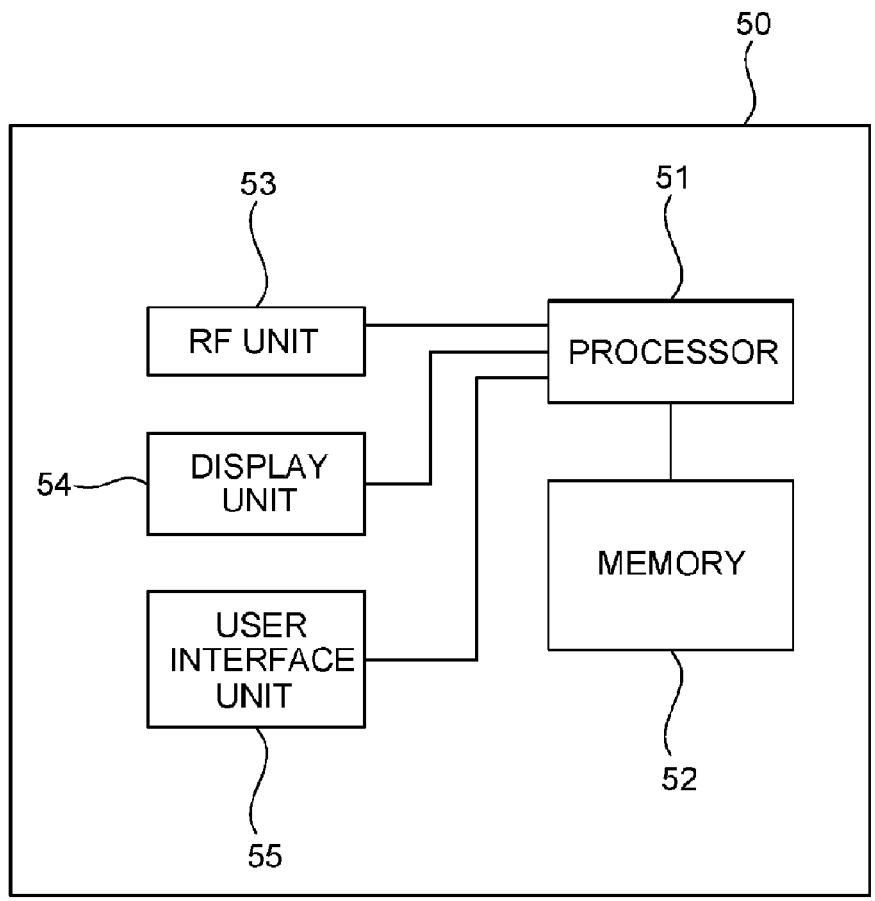
FIG. 3 is a block diagram showing constitutional elements of a user equipment.

FIG. 3 is a block diagram showing constitutional elements of the UE. A UE 50 includes a processor 51, a memory 52, a radio frequency (RF) unit 53, a display unit 54, and a user interface unit 55. Layers of a radio interface protocol are implemented in the processor 51. The processor 51 provides the control plane and the user plane. The function of each layer can be implemented in the processor 51. The memory 52 is coupled to the processor 51 and stores an operating system, applications, and general files. The display unit 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Layers of a radio interface protocol between the UE and the network can be classified into L1 layer (a first layer), L2 layer (a second layer), and L3 layer (a third layer) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
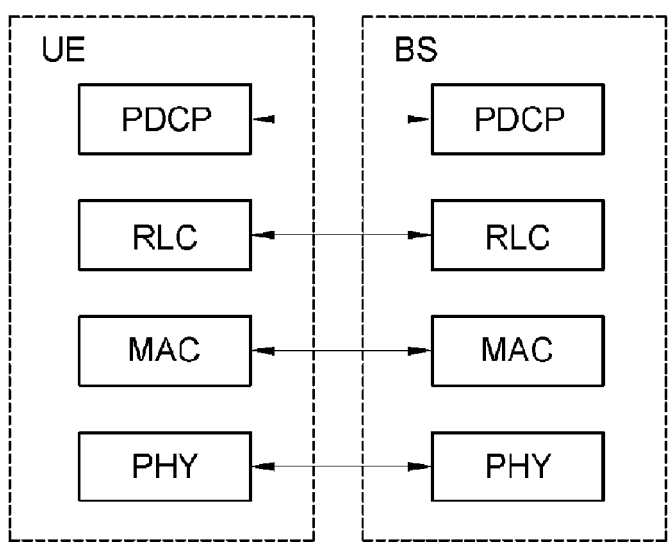
FIG. 4 is a diagram showing a radio protocol architecture for a user plane.
Figure 5:
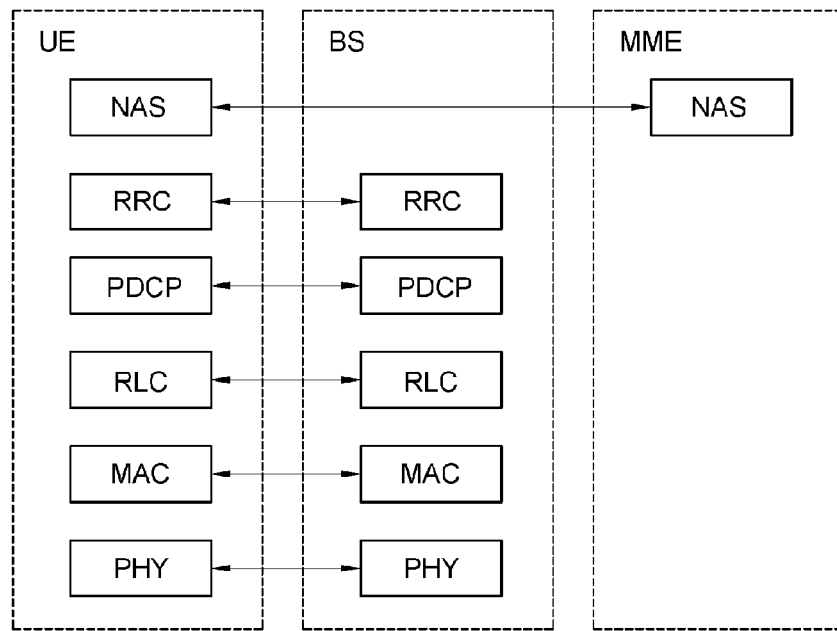
FIG. 5 is a diagram showing a radio protocol architecture for a control plane.

FIG. 4 is a diagram showing a radio protocol architecture for the user plane. FIG. 5 is a diagram showing a radio protocol architecture for the control plane. They illustrate an architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data are transferred through the physical channel. The PHY layer can be modulated by orthogonal frequency division multiplexing (OFDM). Time and/or frequency can be utilized as radio resources.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. A TM RLC is a mode in which no overhead is added to an RLC service data unit (SDU) delivered from an upper layer when an RLC protocol data unit (PDU) is configured. The PDU denotes a unit of block data delivered from a current layer to another layer. Since the RLC allows transparent passing of the SDU, it is called the TM RLC. A UM RLC allows a receiving side to know which PDU is lost when transmission is made by attaching a PDU header including a sequence number (SN) to each PDU. An AM RLC provides bidirectional data transmission services and supports retransmission when the transfer of an RLC PDU fails.

A packet data convergence protocol (PDCP) layer belongs to the second layer and performs a header compression function. When transmitting an IP packet such as an IPv4 packet or an IPv6 packet, a header of the IP packet may contain relatively large and unnecessary control information. The PDCP layer reduces a header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

A downlink transport channel is for transmitting data from the network to the UE. Examples of the downlink control channel includes a broadcast channel (BCH) for transmitting system information, a paging channel (PCH) for transmitting a paging message, and a downlink-shared channel (DL-SCH) for transmitting user traffic or control messages. Traffic of downlink multicast or broadcast service or control messages can be transmitted on the DL-SCH or a downlink multicast channel (MCH). An uplink transport channel is for transmitting data from the UE to the network. Examples of the uplink transport channel include a random access channel (RACH) for transmitting an initial control message and an uplink-shared channel (UL-SCH) for transmitting user traffic or control message.

The BS manages radio resources of one or more cells. One cell is configured to have one of bandwidths such as 1.25, 2.5, 5, 10, 20 MHz and provides downlink or uplink transmission services to several UEs. In this case, different cells can be configured to provide different bandwidths. Cell configuration can be achieved in such as manner that several cells geographically overlap by using several frequencies. The BS informs the UE of basic information for network access by using system information. The system information includes necessary information which needs to be known to the UE so as to access to the BS. Therefore, the UE has to completely receive the system information before accessing to the BS and always has to maintain latest system information. Since the system information has to be known to all UEs within one cell, the BS periodically transmits the system information.

Examples of the logical channel mapped onto the transport channel include a broadcast channel (BCCH), a paging control channel (PCCH), a common control channel (CCCH), a multicast control channel (MCCH), a multicast traffic channel (MTCH), a dedicated control channel (DCCH), etc.

Figure 6:
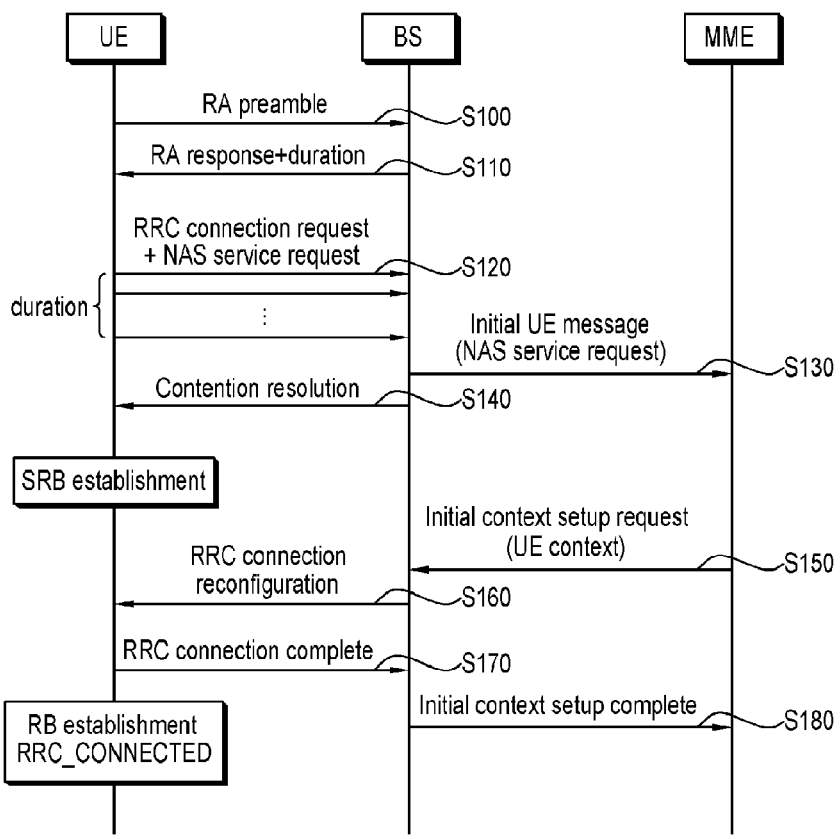
FIG. 6 is a flow diagram showing a radio resource control (RRC) connection establishment process according to an embodiment of the present invention.

FIG. 6 is a flow diagram showing an RRC connection establishment process according to an embodiment of the present invention.

Referring to FIG. 6, according to system information received from a BS or information included in a paging message, a UE selects an available RACH signature and an RACH occasion and then transmits a random access preamble to the BS (step S100). The random access preamble is transmitted through an RACH. The random access preamble is randomly selected from a plurality of preambles when transmitted. When the UE is in an idle state, the UE receives system information from a cell to be connected for an initial network entry and transmits the random access preamble to the BS through the RACH.

In response to the random access preamble, the BS transmits a random access response (step S110). The random access response includes timing offset information (i.e., time advance (TA)), uplink radio resource allocation information (i.e., UL grant) for transmission of an RRC connection request message, duration information for the uplink radio resource, a cell-radio network temporary identity (C-RNTI) for the RRC connection request message, etc.

The duration information for the uplink radio resource indicates the number of transmissions in which a NAS service request message transmitted concatenated with the RRC connection request message are segmented and then transmitted. That is, the duration information denotes information on multiple transmission time intervals (TTIs) for transmitting the RRC connection request message and the NAS service request message. The uplink radio resource allocation information indicates uplink radio resources for the multiple TTIs. The TTI denotes a unit of transmission in which a transmitter transmits data by collectively scheduling data in a time domain. For example, when the transmitter transmits data by performing scheduling in a subframe unit with a predetermined range of a frequency domain and a time domain, the TTI may be a time unit for transmitting subframes. The multiple TTIs denote that data is transmitted through a plurality of TTIs in a split manner. That is, when n TTIs are specified as the multiple TTIs, the RRC connection request message and the NAS service request message are carried and transmitted on n subframes (where n is integer greater than zero). In this case, the duration information may denote transmission of the RRC connection request message and the NAS service request message through temporally continuous n subframes or temporally discontinuous n subframes. The BS performs scheduling on uplink radio resources for the multiple TTIs and reports the uplink radio resource allocation information for the multiple TTIs to the UE. The UE can divide the RRC connection request message and the NAS service request message into n segments in an RRC layer and transmit the segments through n subframes.

Meanwhile, the BS reports information on a random access preamble identifier to the UE by using the system information and paging information. The random access preamble identifier is for identifying the random access response and can be referred to as a random access-radio network temporary identity (RA-RNTI). The random access response may be transmitted through a DL-SCH. The RA-RNTI may be transmitted through a physical dedicated control channel (PDCCH) or a DL L1/L1 control channel (or DL L1/L2 control signaling). The RA-RNTI indicates a random access response transmitted through the DL-SCH.

After receiving the random access response, the UE transmits the RRC connection request message according to radio resource allocation information included in the random access response (step S120). In this case, the UE transmits the NAS service request message concatenated to the RRC connection request message. When transmitted, the RRC connection request message and the NAS service request message are segmented n times (i.e., for n TTIs) specified by the duration information.

The UE monitors the RA-RNTI transmitted through the PDCCH and reads a corresponding DL-SCH message. Then, the UE transmits the RRC connection request message and the NAS service request message according to information on the random access response transmitted using the DL-SCH message. The RRC connection request message and the NAS service request message may be transmitted through a UL-SCH. The UE can transmit the RRC connection request message and the NAS service request message by dividing them into n data segments through an allocated uplink radio resource during n TTIs specified by the duration information. The UE can transmit the RRC connection request message and the NAS service request message simultaneously during the TTIs specified by the duration information irrespective of a channel condition.

The RRC connection request message includes an initial UE identity for a contention resolution and may be transmitted by using hybrid automatic repeat request (HARQ). Since an RLC TM is used, the RRC connection request message is not segmented in an RLC layer. The NAS service request message is an important message used when an MME transmits information on radio bearer (RB) establishment to the BS. The RB establishment is achieved so that user plane data can be transmitted between the BS and the UE.

After receiving the RRC connection request message and the NAS service request message, the BS transmits an initial UE message to the MME (step S130). The initial UE message includes the NAS service request message transmitted by the UE to the BS. The BS transmits NAS information directly to the MME. The NAS information is remaining information other than necessary information for the contention resolution. That is, the NAS service request message is a NAS message between the UE and the MME and is directly delivered by the BS without additional processing.

After receiving the RRC connection request message from the UE, the BS transmits a contention resolution message to the UE (step S140). The contention resolution message is transmitted through the DL-SCH. To report whether a random access process performed by the UE is successful or not, the BS transmits the contention resolution message including an identifier of the UE which has succeeded in the random access. Then, upon receiving the contention resolution message including the UE identifier, the UE knows that the random access is successful, and thus continues subsequent steps. A signaling radio bearer (SRB) is a radio bearer for transmitting control plane data. The SRB is established for the UE which has succeeded in the random access. In the contention based random access, the contention resolution message informs which UE has succeeded in the random access and which UE has failed in the random access, so that the UE which has failed in the random access can perform again the random access process more promptly. This is called an early contention resolution.

Upon receiving the NAS message from the BS, the MME transmits to the BS an initial context setup request message including UE context information (step S150). The UE context information is for RB establishment by which the user plane data can be transmitted between the BS and the UE.

The BS transmits to the UE an RRC connection reconfiguration message on the basis of the UE context information (step S160). The RRC connection reconfiguration message includes information for RRC connection establishment between the UE and the BS.

The UE completes all establishments for data communication with the BS and transmits an RRC connection complete message to the BS (step S170). The UE establishes an RB for transmission of the user plane data and enters an RRC_CONNECTED state. The UE starts data communication with the BS.

The BS transmits an initial context setup complete message to the MME and thus completely establishes a connection with the MME (step S180).

It is required to complete an RRC connection establishment process within a delay time less than 100 ms or below. To reduce the delay time of the RRC connection establishment process, the NAS service request has to be performed much faster. When the RRC connection request message and the NAS service request message are simultaneously transmitted, NAS information can be transmitted before the SRB is established between the BS and the UE, thereby reducing the delay time. However, a UE located in a cell edge or a UE having a poor channel environment cannot transmit the NAS service request message together through an uplink radio resource allocated for the RRC connection request message. For example, in a poor channel environment, if the HARQ is not used, the UE can transmit a message having a size of 24 bits through the uplink radio resource allocated for the RRC connection request message, and if the HARQ is used two times, the UE can transmit a message having a size of about 72 bits. Therefore, the UE cannot simultaneously transmit the RRC connection request message and the NAS service request message. After the SRB is established between the BS and the UE, the UE can separately transmit the NAS service request message. That is, transmission of the NAS service request message is delayed by a time for establishing the SRB between the BS and the UE, and the delay time for the RRC connection establishment process increases. In the proposed method, the duration information for the RRC connection request message is provided so that the RRC connection request message and the NAS service request message can be simultaneously transmitted even when a channel environment is poor, and thus the delay time of the RRC connection establishment process can be reduced.

Figure 7:
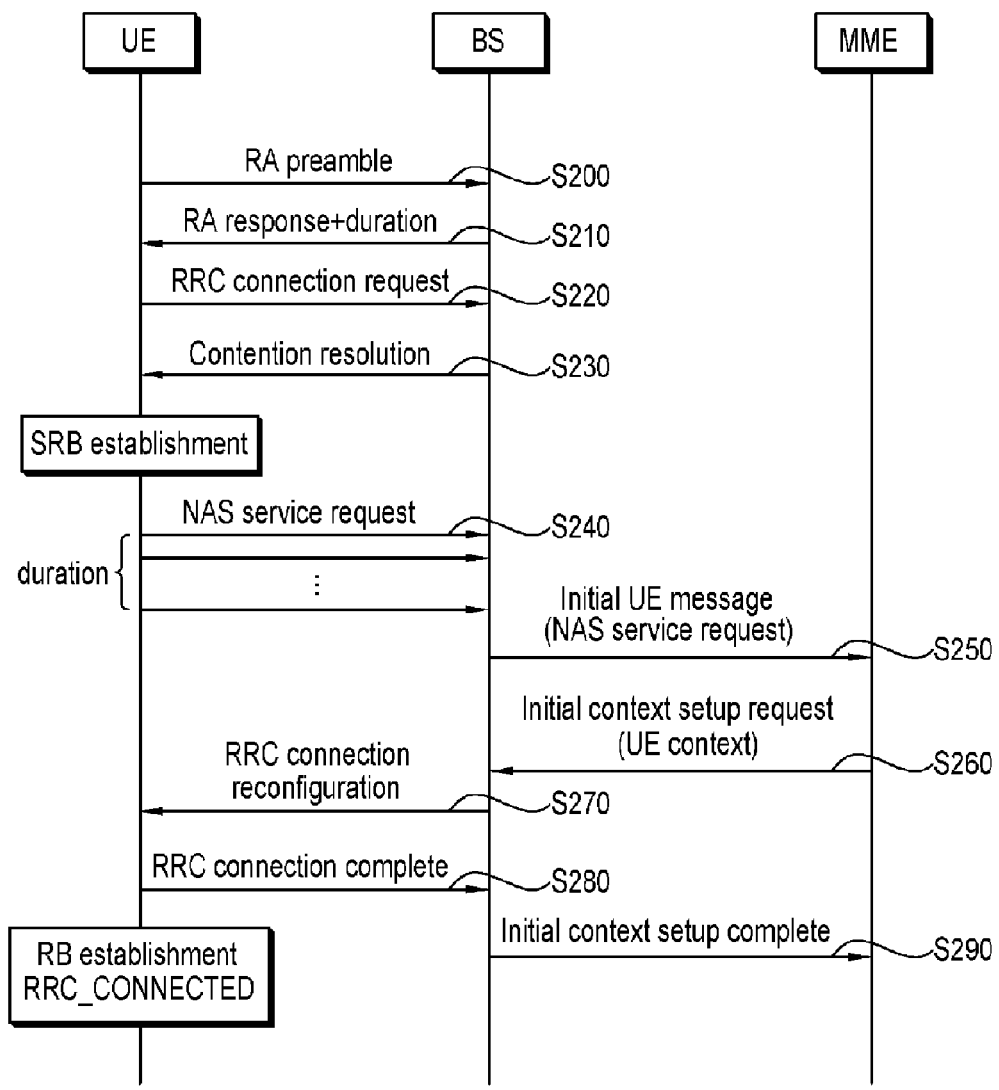
FIG. 7 is a flow diagram showing an RRC connection establishment process according to another embodiment of the present invention.

FIG. 7 is a flow diagram showing an RRC connection establishment process according to another embodiment of the present invention.

Referring to FIG. 7, according to system information received from a BS or information included in a paging message, a UE selects an available RACH signature and an RACH occasion and then transmits a random access preamble to the BS (step S200).

In response to the random access preamble, the BS transmits a random access response (step S210). The random access response includes timing offset information (i.e., time advance (TA)), uplink radio resource allocation information (i.e., UL grant) for transmission of an RRC connection request message, duration information for a NAS service request message, and a C-RNTI for the RRC connection request message. The duration information for the NAS service request message may be information on multiple TTIs in which the NAS service request message is segmented and then transmitted. The multiple TTIs may denote a plurality of subframes on which the NAS service request message is carried and transmitted. The multiple TTIs may denote temporally continuous n subframes or temporally discontinuous n subframes.

After receiving the random access response, the UE transmits the RRC connection request message according to radio resource allocation information included in the random access response (step S220). The UE monitors an RA-RNTI transmitted through a PDCCH and reads a corresponding DL-SCH message. Then, the UE transmits the RRC connection request message according to information on the random access response transmitted using the DL-SCH message.

After receiving the RRC connection request message from the UE, the BS transmits a contention resolution message to the UE (step S230). The contention resolution message is transmitted through the DL-SCH. A signaling radio bearer (SRB), which is a radio bearer for transmitting control plane data, is established for the UE which has received the contention resolution message.

The UE transmits the NAS service request message to the BS (step S240). According to the NAS service request message, an MME transmits RB establishment information to the BS. The RB establishment information is used so that user plane data can be transmitted between the BS and the UE. The NAS service request message may be transmitted using an uplink radio resource specified by the duration information. The NAS service request message can be divided into n segments according to the duration information and thus can be transmitted through n subframes, that is, n TTIs. The UE can transmit a large amount of NAS information in a more effective manner through several TTIs.

After receiving the NAS service request message, the BS transmits an initial UE message to the MME (step S250). The initial UE message includes the NAS service request message transmitted by the UE to the BS.

Upon receiving the NAS message from the BS, the MME transmits to the BS an initial context setup request message including UE context information (step S260). The UE context information is for RB establishment by which the user plane data can be transmitted between the BS and the UE.

The BS transmits to the UE an RRC connection reconfiguration message on the basis of the UE context information (step S270). The RRC connection reconfiguration message includes information for RRC connection establishment between the UE and the BS.

The UE completes all establishments for data communication with the BS and transmits an RRC connection complete message to the BS (step S280). The UE establishes an RB for transmission of the user plane data and enters an RRC_CONNECTED state. The UE starts data communication with the BS.

The BS transmits an initial context setup complete message to the MME and thus completely establishes a connection with the MME (step S290).

Figure 8:
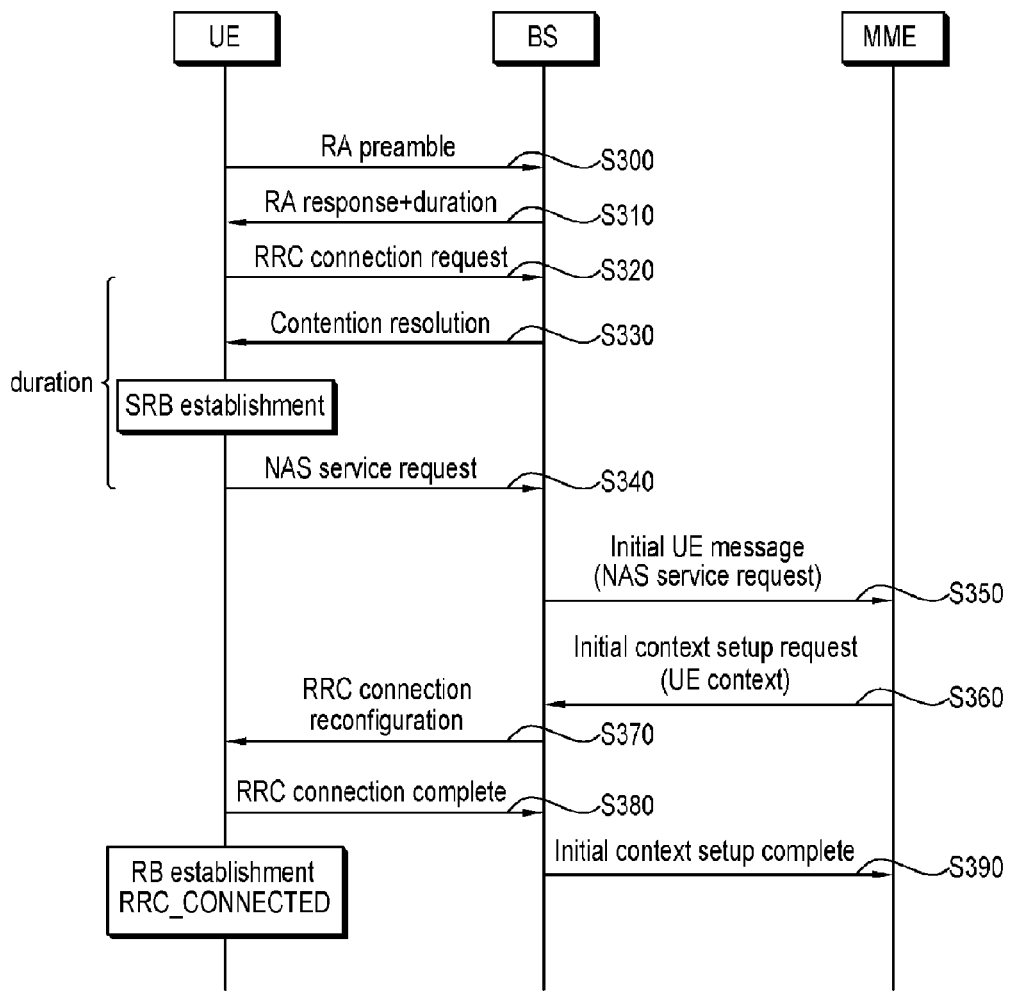
FIG. 8 is a flow diagram showing an RRC connection establishment process according to another embodiment of the present invention.

FIG. 8 is a flow diagram showing an RRC connection establishment process according to another embodiment of the present invention.

Referring to FIG. 8, according to system information received from a BS or information included in a paging message, a UE selects an available RACH signature and an RACH occasion and then transmits a random access preamble to the BS (step S300).

In response to the random access preamble, the BS transmits a random access response (step S310). The random access response includes timing offset information (i.e., time advance (TA)), uplink radio resource allocation information (i.e., UL grant) for transmission of an RRC connection request message, duration information for a NAS service request message, and a C-RNTI for the RRC connection request message. The duration information for the NAS service request message may be uplink radio resource allocation information for transmitting NAS service request message. The duration information may indicate several TTIs after which the NAS service request message is transmitted using the uplink radio resource after the RRC connection request message is transmitted.

After receiving the random access response, the UE transmits the RRC connection request message according to radio resource allocation information included in the random response (step S320). The UE monitors an RA-RNTI transmitted through a PDCCH and reads a corresponding DL-SCH message. Then, the UE transmits the RRC connection request message according to information on the random response transmitted using the DL-SCH message.

After receiving the RRC connection request message from the UE, the BS transmits a contention resolution message to the UE (step S330). The contention resolution message is transmitted through the DL-SCH. A signaling radio bearer (SRB), which is a radio bearer for transmitting control plane data, is established for the UE which has received the contention resolution message.

The UE transmits the NAS service request message to the BS (step S340). According to the NAS service request message, an MME transmits RB establishment information to the BS. The RB establishment information is used so that user plane data can be transmitted between the BS and the UE. The NAS service request message may be transmitted using an uplink radio resource specified by the duration information. The uplink radio resource for the NAS service request message may be allocated prior to SRB establishment, so that transmission of the NAS service request message can be performed much faster.

After receiving the NAS service request message, the BS transmits an initial UE message to the MME (step S350). The initial UE message includes the NAS service request message transmitted by the UE to the BS.

Upon receiving the NAS message from the BS, the MME transmits to the BS an initial context setup request message including UE context information (step S360). The UE context information is for RB establishment by which the user plane data can be transmitted between the BS and the UE.

The BS transmits to the UE an RRC connection reconfiguration message on the basis of the UE context information (step S370). The RRC connection reconfiguration message includes information for RRC connection establishment between the UE and the BS.

The UE completes all establishments for data communication with the BS and transmits an RRC connection complete message to the BS (step S380). The UE establishes an RB for transmission of the user plane data and enters an RRC_CONNECTED state. The UE starts data communication with the BS.

The BS transmits an initial context setup complete message to the MME and thus completely establishes a connection with the MME (step S390).

Figure 9:
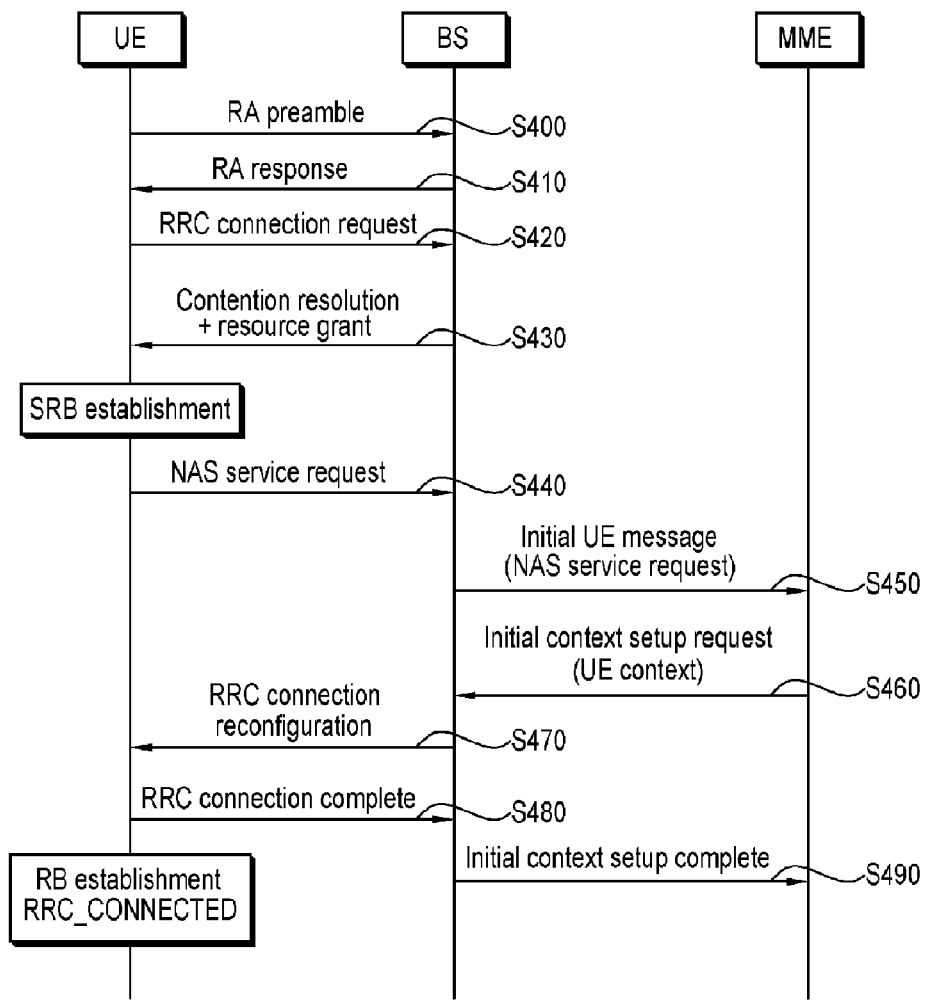
FIG. 9 is a flow diagram showing an RRC connection establishment process according to another embodiment of the present invention.

FIG. 9 is a flow diagram showing an RRC connection establishment process according to another embodiment of the present invention.

Referring to FIG. 9, according to system information received from a BS or information included in a paging message, a UE selects an available RACH signature and an RACH occasion and then transmits a random access preamble to the BS (step S400).

In response to the random access preamble, the BS transmits a random access response (step S410). The random access response includes timing offset information (i.e., time advance (TA)), uplink radio resource allocation information (i.e., UL grant) for transmission of an RRC connection request message, and a C-RNTI for the RRC connection request message.

After receiving the random access response, the UE transmits the RRC connection request message according to radio resource allocation information included in the random access response (step S420). The UE monitors an RA-RNTI transmitted through a PDCCH and reads a corresponding DL-SCH message. Then, the UE transmits the RRC connection request message according to information on the random access response transmitted using the DL-SCH message.

After receiving the RRC connection request message from the UE, the BS transmits a contention resolution message to the UE (step S430). The contention resolution message includes radio resource allocation information (i.e., resource grant) for a NAS service request message. A signaling radio bearer (SRB), which is a radio bearer for transmitting control plane data, is established for the UE which has received the contention resolution message. When the SRB is established, it is sure that the UE transmits the NAS service request message. Therefore, the BS allocates a radio resource for the NAS service request message without having to receive an additional radio resource request from the UE.

The UE transmits the NAS service request message to the BS (step S440). According to the NAS service request message, an MME transmits RB establishment information to the BS. The RB establishment information is used so that user plane data can be transmitted between the BS and the UE. The NAS service request message may be transmitted according to the radio resource allocation information transmitted together with the contention resolution message. The uplink radio resource for the NAS service request message may be allocated prior to SRB establishment, so that transmission of the NAS service request message can be performed much faster.

After receiving the NAS service request message, the BS transmits an initial UE message to the MME (step S450). The initial UE message includes the NAS service request message transmitted by the UE to the BS.

Upon receiving the NAS message from the BS, the MME transmits to the BS an initial context setup request message including UE context information (step S460). The UE context information is for RB establishment by which the user plane data can be transmitted between the BS and the UE.

The BS transmits to the UE an RRC connection reconfiguration message on the basis of the UE context information (step S470). The RRC connection reconfiguration message includes information for RRC connection establishment between the UE and the BS.

The UE completes all establishments for data communication with the BS and transmits an RRC connection complete message to the BS (step S480). The UE establishes an RB for transmission of the user plane data and enters an RRC_CONNECTED state. The UE starts data communication with the BS.

The BS transmits an initial context setup complete message to the MME and thus completely establishes a connection with the MME (step S490).

Figure 10:
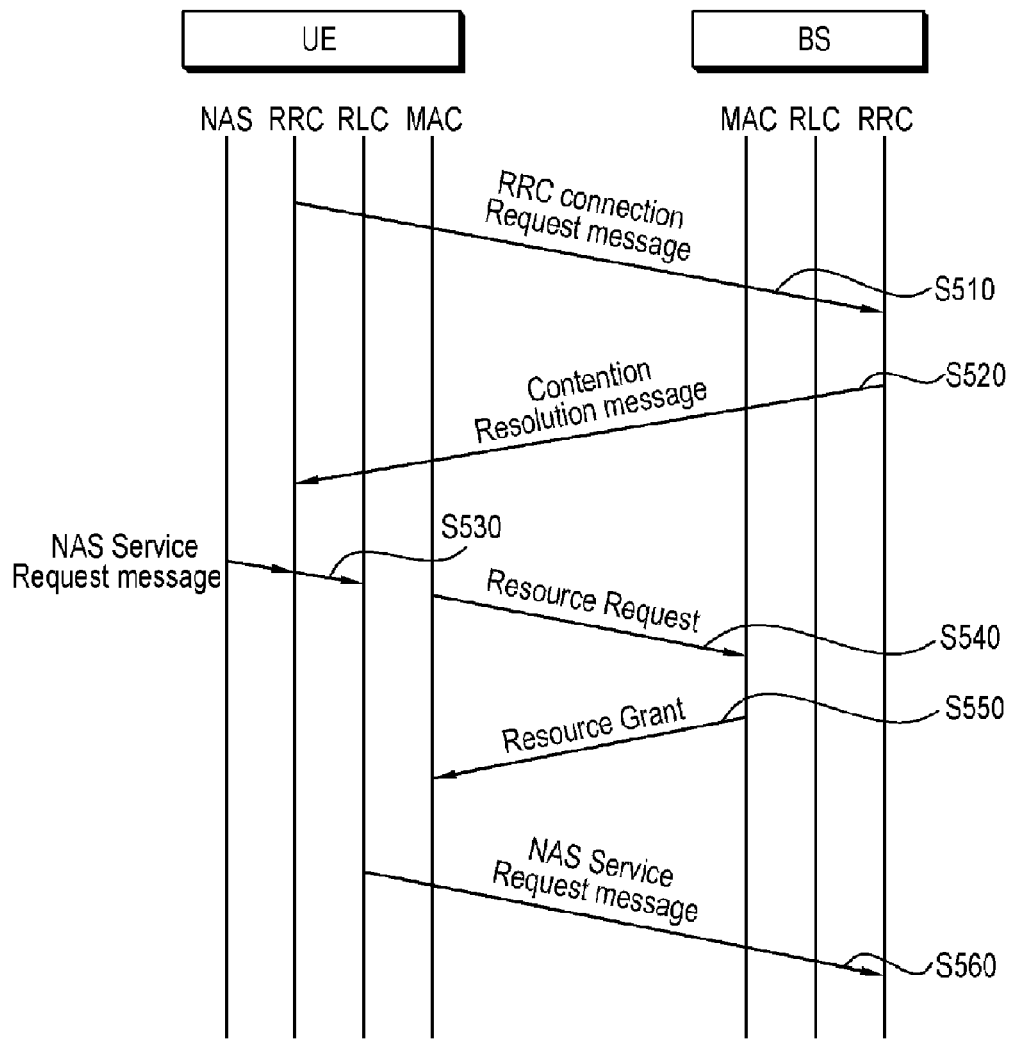
FIG. 10 is a flow diagram showing an exemplary process of transmitting a non-access stratum (NAS) message.

FIG. 10 is a flow diagram showing an exemplary process of transmitting a NAS message. Herein, messages are transmitted for respective layers of a UE and a BS in an RRC connection establishment process.

Referring to FIG. 10, the UE receives a random access response in response to a random access preamble and transmits an RRC connection request message (step S510). The RRC connection request message is transmitted through RRC signaling between an RRC layer of the UE and an RRC layer of the BS. The RRC connection request message includes an initial UE identity for a contention resolution. HARQ may be used to transmit the RRC connection request message. Since an RLC TM is used for the RRC connection request message, the RRC connection request message is not segmented in an RLC layer.

After receiving the RRC connection request message from the UE, the BS transmits a contention resolution message to the UE (step S520). The contention resolution message is transmitted through RRC signaling between the RRC layer of the UE and the RRC layer of the BS. When the UE receives the contention resolution message, a signaling radio bearer (SRB), which is a radio bearer for transmitting control plane data, is established for the UE. As a result, the UE can transmit a NAS message.

A NAS layer of the UE transmits a NAS service request message to a lower layer (step S530). According to the NAS service request message, an MME transmits RB establishment information to the BS. The RB establishment information is used so that user plane data can be transmitted between the BS and the UE. The NAS service request message is sent to the RLC layer via the RRC layer. In the RLC layer, the NAS service request message is sent to a buffer of a MAC layer. Then, the MAC layer recognizes that there is data to be transmitted.

A MAC layer of the UE transmits a resource request message for the NAS service request message to a MAC layer of the BS (step S540). The MAC layer of the UE requests an uplink radio resource for transmitting the NAS service request message.

In response to the radio resource request of the UE, the MAC layer of the BS transmits a resource grant message to the MAC layer of the UE (step S550).

After receiving radio resource allocation message, the UE transmits to the BS the NAS service request message stored in the buffer of the MAC layer via a PHY layer by using the allocated radio resource (step S560).

The NAS message can be transmitted after establishing an SRB which is a radio bearer for transmitting control plane data. Thus, the UE requests the BS to allocate a radio resource for transmitting the NAS service request message after receiving a contention resolution message, and transmits the NAS service request message by using the allocated radio resource. However, upon receiving the contention resolution message, it can be sure that the UE always transmits the NAS service request message. Therefore, a process of requesting and confirming the radio resource for the NAS service request message may be unnecessary. A method of further effectively transmitting the NAS message will be now described.

Figure 11:
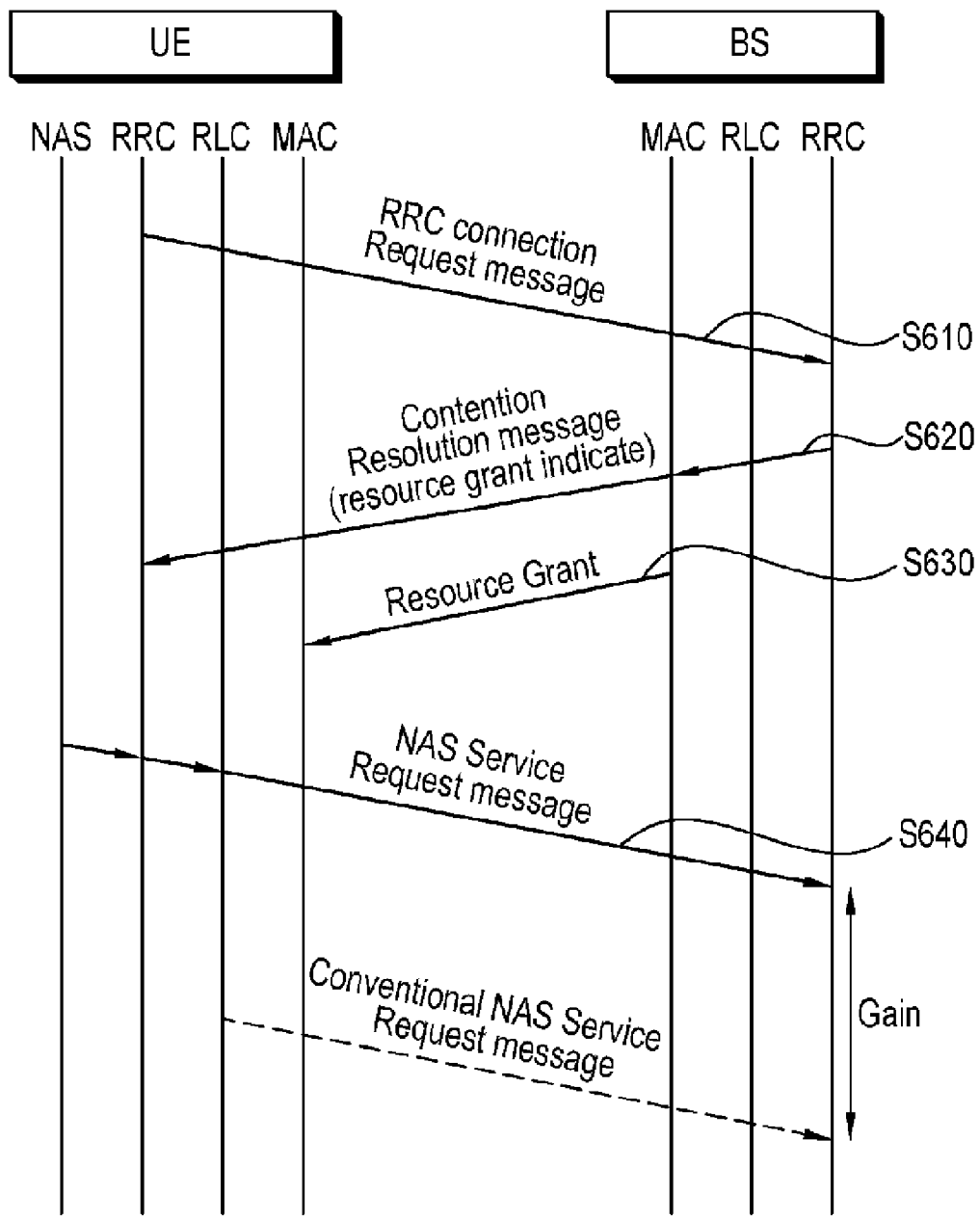
FIG. 11 is a flow diagram showing a process of transmitting a NAS message according to an embodiment of the present invention.

FIG. 11 is a flow diagram showing a process of transmitting a NAS message according to an embodiment of the present invention. Herein, messages are transmitted for respective layers of a UE and a BS in an RRC connection establishment process.

Referring to FIG. 11, the UE receives a random access response in response to a random access preamble and transmits an RRC connection request message (step S610). The RRC connection request message is transmitted through RRC signaling between an RRC layer of the UE and an RRC layer of the BS. The RRC connection request message includes an initial UE identity for a contention resolution. HARQ may be used to transmit the RRC connection request message. Since an RLC TM is used for the RRC connection request message, the RRC connection request message is not segmented in an RLC layer.

After receiving the RRC connection request message from the UE, the BS transmits a contention resolution message to the UE (step S620). The contention resolution message is transmitted through RRC signaling between the RRC layer of the UE and the RRC layer of the BS. In this case, the BS allocates an uplink radio resource upon receiving the RRC connection request message. The RRC layer instructs the MAC layer to allocate a radio resource for a NAS service request message to be transmitted by the UE. That is, without additionally receiving a radio resource request message for the NAS service request message from the UE, the radio resource for the NAS service request message is automatically allocated when the RRC connection request message is received.

A MAC layer of the BS transmits a resource grant message to a MAC layer of the UE (step S630).

An SRB is established in the UE which has received the contention resolution message, and the NAS service request message is transmitted using the allocated radio resource (step S640). The NAS service request message is sent from a NAS layer of the UE to a lower layer, and is transmitted directly to the BS without having to wait in a buffer of the MAC layer. That is, the proposed method for transmitting the NAS service request message has an advantage over the conventional method for transmitting the NAS service request message in that the radio resource request does not have to be performed. In the proposed method, it is possible to reduce an overhead occurring when a radio resource request/confirm process is performed after the SRB is established. Accordingly, a time required for performing the RRC connection establishment process can be reduced. Upon transitioning from an idle state to an active state, the UE can establish the SRB through a random access process and directly transmit a first NAS message without additionally requesting a radio resource for the first NAS message when the first NAS message is transmitted in uplink. Therefore, a time for performing the RRC connection establishment process can be reduced.

It has been described above that, in the RRC connection establishment process, the NAS service request message is transmitted through several TTIs by providing the duration information for the transmission of the NAS service request message. Such a method can be applied not only when the NAS service request message is transmitted in the RRC connection establishment process but also when information is transmitted in a split manner through several TTIs by utilizing the duration information in a communication process requiring accurate information transmission in an environment having a poor channel condition.

Every function as described above can be performed by a processor such as a microprocessor based on software coded to perform such function, a program code, etc., a controller, a micro-controller, an Application Specific Integrated Circuit (ASIC), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of performing a random access process in a wireless communication system, the method comprising:
   transmitting, by a user equipment, a random access preamble to a base station;
   receiving, by the user equipment, a random access response from the base station as a response to the random access preamble, the random access response including uplink radio resource allocation information for a radio resource control (RRC) connection request message and duration information for a non-access stratum (NAS) service request message, the duration information indicating multiple transmission time intervals (TTIs) for transmitting the NAS service request message;
   transmitting the RRC connection request message according to the uplink radio resource allocation information; and
   transmitting the NAS service request message by being segmented across the multiple TTIs according to the duration information.

2. The method of claim 1, wherein the NAS service request message and the RRC connection request message are transmitted in a concatenated manner.

3. The method of claim 1, wherein the NAS service request message is transmitted after the RRC connection request message is transmitted and after a signaling radio bearer (SRB), which is a radio bearer for transmitting control plane data, is established.

4. The method of claim 1, wherein the multiple TTIs are a plurality of temporally continuous subframes.

5. The method of claim 1, wherein the multiple TTIs are a plurality of temporally discontinuous subframes.

6. The method of claim 1, further comprising receiving a contention resolution message in response to the RRC connection request message.

7. The method of claim 6, wherein the contention resolution message is received after transmitting the NAS service request message.

8. The method of claim 1, wherein a contention resolution message is received before transmitting the NAS service request message.

* * * * *